(12) United States Patent
Obiols et al.

(10) Patent No.: US 8,069,540 B2
(45) Date of Patent: Dec. 6, 2011

(54) STRAPPING SYSTEM

(75) Inventors: Josep Obiols, Barcelona (ES); Gemma Rovira, Barcelona (ES)

(73) Assignee: Velcro Industries B.V., Curacao ( * ) Notice: Subject to any disclaimer, the term of this patent is extended or adjusted under 35 U.S.C. 154(b) by 604 days.

(21) Appl. No.: 11/679,110

(22) Filed: Feb. 26, 2007

(65) Prior Publication Data

US 2008/0201915 A1   Aug. 28, 2008

(51) Int. Cl.
*A44B 18/00* (2006.01)
(52) U.S. Cl. .................. 24/306; 24/265 R; 24/265 AL
(58) Field of Classification Search ............... 24/306, 24/446, 265 R, 265 AL
See application file for complete search history.

(56) References Cited

U.S. PATENT DOCUMENTS

| | | | |
|---|---|---|---|
| 3,994,048 A * | 11/1976 | Rosenthal | 24/306 |
| 4,426,957 A * | 1/1984 | Horrigan | 119/865 |
| 4,862,563 A | 9/1989 | Flynn | |
| 4,872,243 A * | 10/1989 | Fischer | 24/442 |
| 4,893,381 A | 1/1990 | Frankel | |
| 4,984,339 A | 1/1991 | Provost et al. | |
| 5,008,987 A * | 4/1991 | Armour, II | 24/442 |
| 5,136,759 A | 8/1992 | Armour | |
| 5,142,743 A | 9/1992 | Hahn | |
| 5,167,050 A | 12/1992 | Korsen | |
| 5,201,100 A | 4/1993 | Cardinale | |
| 5,260,015 A * | 11/1993 | Kennedy et al. | 264/167 |
| 5,289,619 A | 3/1994 | Pileggi | |
| 5,548,871 A | 8/1996 | Trethewey | |
| 5,604,961 A * | 2/1997 | Cole | 24/306 |
| 5,634,245 A | 6/1997 | Rouser et al. | |
| 5,769,290 A * | 6/1998 | Pestana | 24/306 |
| 5,785,011 A * | 7/1998 | Gitterman, III | 119/865 |
| 5,806,087 A * | 9/1998 | Grotefend | 2/1 |
| 6,049,953 A | 4/2000 | McCay et al. | |
| 6,317,933 B1 | 11/2001 | Suenaga | |
| 6,546,603 B1 | 4/2003 | Wang et al. | |
| 6,551,539 B1 | 4/2003 | Leach et al. | |
| 7,284,505 B1 * | 10/2007 | Paxton et al. | 24/306 |
| 2005/0081345 A1 | 4/2005 | Tolan et al. | |
| 2005/0117819 A1 | 6/2005 | Kingsford et al. | |

* cited by examiner

*Primary Examiner* — Robert J Sandy
(74) *Attorney, Agent, or Firm* — Fish & Richardson P.C.

(57) ABSTRACT

A strapping system including a strap having opposite first and second faces carrying first and second arrays of touch fastening elements respectively and a buckle assembly releasably attached to one end of the strap and defining an opening sized to receive an opposite end of the strap. The buckle assembly includes a buckle and an attachment portion coupled to the buckle, the attachment portion having opposing surfaces that releasably engage the touch fastening elements on the first and second faces of the strap, respectively, to releasably secure the buckle to the strap, wherein the strap includes touch fastening elements engageable with other touch fastening elements of the strapping system when the buckle assembly attached to the strap to secure the strapping system about an object.

15 Claims, 9 Drawing Sheets

STRAPPING SYSTEM

TECHNICAL FIELD

This invention relates to strapping systems and methods of their use and manufacture.

BACKGROUND

There are many commercial, industrial, and residential applications that involve securing or bundling items together with straps. For example, in the automotive or telecommunication industries, wires or wiring harnesses are often bundled together using straps. Similarly, in the transportation industry, straps are used to bundle goods together or to secure goods to pallets. These straps are typically releasably secured to enable the bundles to be separated later if needed (e.g., for distribution, for repair, etc.).

One type of strap is known as a touch fastening strap. Touch fastening straps typically have an array of touch fastening elements on one portion of a fabric or resin strap and an array of touch fastening element on another portion of the strap. The strap is then looped around the items to be bundled and the two touch fastening arrays are coupled together. Once touch fastened, the arrays may create a releasable closure that has relatively strong resistance to shear forces to keep the items bundled but has relatively low resistance to peel forces to enable a person to easily peel the strap apart to release the bundle.

Touch fastening straps may be formed in a variety of ways. For example, touch fastening straps may be formed by laminating or welding together hooks and loop arrays created using a weaving process. Touch fastening straps may also be created using an in-situ molding process. For example, techniques for forming a hook and loop material for a touch fastening strap is disclosed in U.S. Pat. No. 5,260,015 to Kennedy et al. and U.S. Pat. No. 4,872,243 to Fischer, both of which are incorporated here by reference.

SUMMARY

In general, in one aspect, a strapping system including a strap having opposite first and second faces carrying first and second arrays of touch fastening elements respectively and a buckle assembly releasably attached to one end of the strap and defining an opening sized to receive an opposite end of the strap. The buckle assembly includes a buckle and an attachment portion coupled to the buckle, the attachment portion having opposing surfaces that releasably engage the touch fastening elements on the first and second faces of the strap, respectively, to releasably secure the buckle to the strap, wherein the strap includes touch fastening elements engageable with other touch fastening elements of the strapping system with the buckle assembly attached to the strap to secure the strapping system about an object.

Further implementations may include an aspect where the touch fastening elements that are engageable when the buckle assembly is attached to the strap are located on a distal end of the strap and an aspect where the touch fastening elements that are engageable when the buckle assembly are engageable with the first array of touch fastening elements. Implementations also include where the touch fastening elements that are engageable when the buckle assembly are engageable with touch fastening elements carried on an outer surface of the attachment portion. Implementations also include one where the strap includes a strap and a tongue attached to the strap. In this implementation, the tongue assembly includes a tongue portion and a second attachment portion coupled to the tongue portion, the second attachment portion having opposing surfaces that releasably engage the touch fastening elements on the first and second faces of the strap, respectively, to releasably secure the tongue portion to the strap.

In general, in another aspect, there is a method of configuring a buckle for connection to a strap, the method including providing a piece of material having touch fastening elements arrayed on one side, wrapping the piece of material around one leg of a buckle, such that the touch fastening elements on the material face each other after the material is wrapped around the buckle, and bonding the piece of material to itself to create a loop portion encircling the one leg.

In general, in one aspect, a buckle assembly includes a buckle and a piece of material having touch fastening elements arrayed on a fastening side of the material, the piece of material wrapped around one leg of the buckle and bonded to itself to secure the piece of material to the buckle, with portions on the fastening side of the material facing each other.

In general, in one aspect, a strapping system includes a strap having opposite first and second faces carrying first and second arrays of touch fastening elements respectively and a first buckle assembly releasably attached to one end of the strap. The first buckle assembly has a first buckle and a first attachment portion coupled to the first buckle, the first attachment portion having opposing surfaces that releasably engage the touch fastening elements on the first and second faces of the strap, respectively, to releasably secure the first buckle to the strap. The strapping system also includes a second buckle assembly releasably attached to another end of the strap. The second buckle assembly includes a second buckle configured to interlock with the first buckle and a second attachment portion coupled to the second buckle, the second attachment portion having opposing surfaces that releasably engage the touch fastening elements on the first and second faces of the strap, respectively, to releasably secure the second buckle to the strap.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
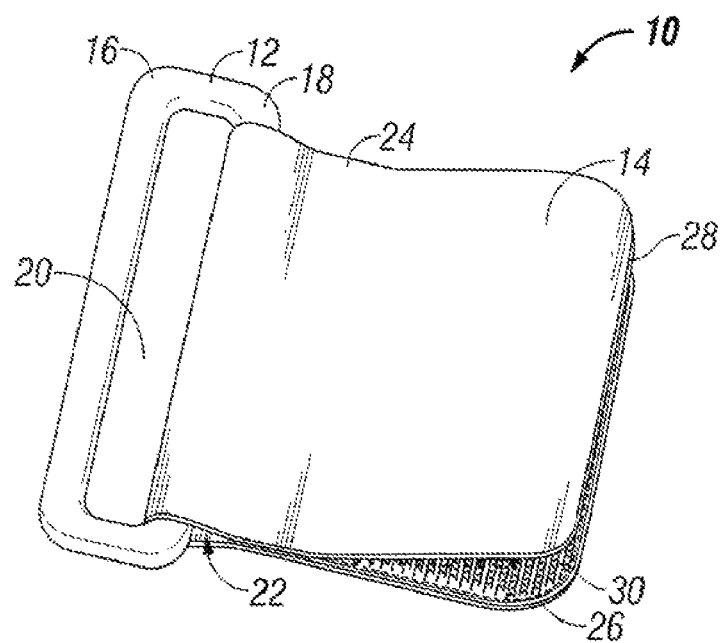
FIG. 1 is a top view of a buckle assembly in accordance with some embodiments.

With reference to FIG. 1, a top view of a buckle assembly 10 in accordance with one embodiment is illustrated. The buckle assembly 10 includes a buckle 12 and an attachment portion 14. The buckle 12 may be any form of rectangular or curved rim or fitment that when attached to one of a strap is able to fasten that end to another part of the strap or a different strap. The buckle 12 may alternatively be configured to couple to another interlocking buckle at another part of the strap (see FIG. 12, for example). In the configuration illustrated in FIG. 1, the buckle 12 has a first leg 16 and a second leg 18 that define an opening 20, which is sized to receive the strap, as will be described further below. The buckle 12 may be formed, cast, or otherwise constructed from any suitably rigid material. For example, the buckle 12 may comprise plastic, metal, wood, or a composite material.

The attachment portion 14 may be composed of any material capable of holding or forming touch fastening elements. Touch fastening elements include any suitable type of connector capable of fastening to a complementary touch fastening element via physical contact between the touch fastening elements. Touch fastening elements can be male fastener elements (e.g., j-hooks, mushroom hooks, and the like), such as j-hook #65 produced by and available from Velcro USA Incorporated of Manchester, N.H. Touch fastening elements can also be female fastener elements (e.g., woven or formed loops or fibers), such as loops #1000 and #2000 also produced by an available from Velcro USA Incorporated of Manchester, N.H. Further, in some configurations, touch fastening elements can include a combination of male and female fastener elements, such as OMNI-TAPE® produced by Velcro USA Incorporated of Manchester, N.H. Other suitable touch fastening elements may also be employed.

Two touch fastening elements or two arrays of touch fastening elements are complementary if the two touch fastening elements are releasably engaged to each other without tools (i.e., toollessly) to create a closure. For example, a male touch fastening element is complementary with female touch fastening elements and vice-versa. Further, certain types of male touch fastening elements, such as so-called mushroom hooks, may also be complementary with other male touch fastening elements (i.e., the male touch fastening elements interlock with each other to form a closure). In addition, arrays of touch fastening elements composed of a combination of male and female touch fastening elements, such as the OMNI-TAPE® mentioned above, are complementary with each other, with an array of exclusively male touch fastening elements, or with an array of exclusively female touch fastening elements.

In the configuration illustrated in FIG. 1, the material comprising the attachment portion 14 has touch fastening elements on one side of the material and a smooth (non-touch fastener) surface on the other side. In alternate configurations, touch fastening elements are located on both sides of the material forming the attachment portion 14. The material of the attachment portion 14 may be created using one or more of the techniques described in U.S. Pat. No. 4,872,243 to Fischer. The attachment portion 14 may include a piece of ULTRA-MATE® 805 hook material having polyamide J-hooks in size CFM 22 produced by and available from Velcro USA Incorporated of Manchester, N.H. Alternate materials and techniques may also be used.

The attachment portion 14 is coupled to the buckle 12 in any one of a variety of suitable ways. In the configuration illustrated in FIG. 1, the attachment portion 14 is wrapped around the second leg 18 and fastened to itself to create a wrap around section 22, a bonded section 24, a first flap 26, and a second flap 28. This configuration creates an attachment portion having a generally "Y" shape. As shown, the first flap 26 carries an array 30 of touch fastening elements, as described above. The second flap 28 also may carry an array 32 of touch fastening elements (shown in FIG. 2) that face the array 30. The arrays 30 and 32 can have similar or different types of touch fastening elements.

The attachment portion 14 may be bonded to itself at the bonded section 24 in various suitable ways. For example, the attachment portion 14 can be welded by heat, pressure, ultrasonic waves, radio frequency waves, or a combination of these or other welding techniques. The bonded section 24 could also be bonded by sewing, gluing, or otherwise joining the material of the attachment portion 14 to itself.

Figure 2:
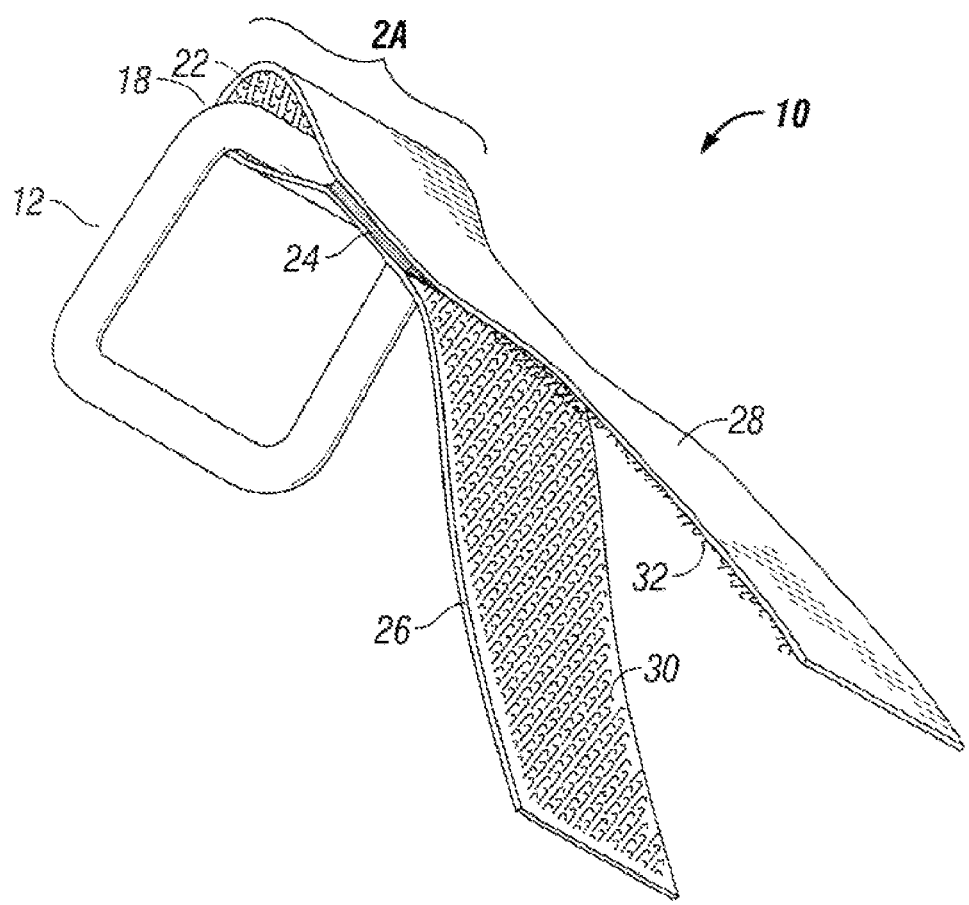
FIG. 2 is a side view of the buckle assembly of FIG. 1 in accordance with some embodiments.
Figure 2A:
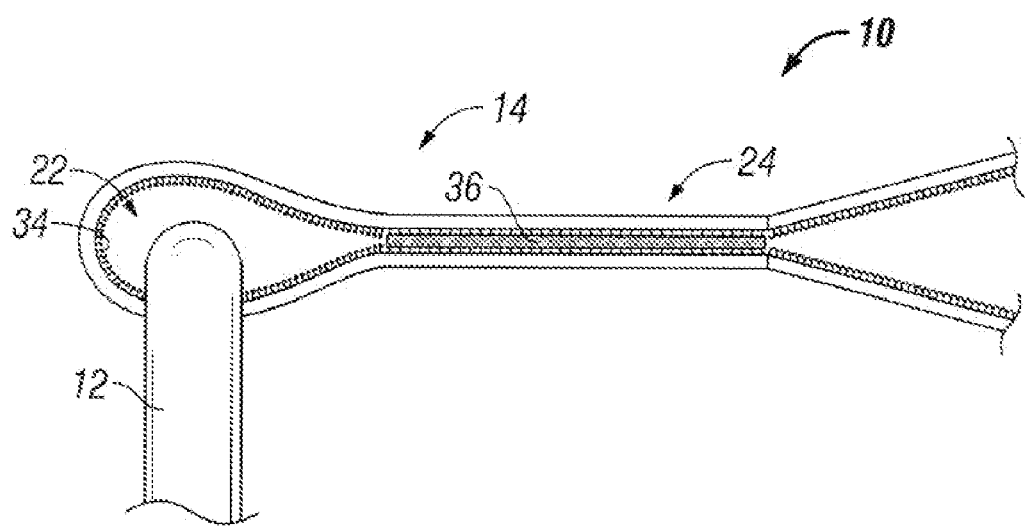
FIG. 2A is an enlarged cross-sectional view of the part of the buckle assembly of FIG. 1 in accordance with some embodiments.

FIG. 2 illustrates a side view of the buckle assembly 10 of FIG. 1. FIG. 2 more clearly shows the "Y" shape of the attachment portion and how the attachment portion 14 is wrapped around the leg 18 of the buckle 12. FIG. 2 further illustrates the array 32 of touch fastening elements carried on the second flap 28 as well as the array 30 of touch fastening elements on an opposing side of the first flap 26. FIG. 2A illustrates an enlarged cross-sectional view of the buckle 12, the wrap around section 22, and the bonded section 24 in accordance with one embodiment. As shown, the wrap around section 22 may include a plurality of touch fastening elements 34 (e.g., j-hooks) attached to an inner surface of the material of attachment portion 14. The touch fastening elements 34 can be freestanding (i.e., not fastened to the buckle 12) or they can be fastened to one or more complementary touch fastening elements on the buckle 12 (not shown). In some configurations, the touch fastening elements 34 are omitted from the wrap around section 22.

Figure 3:
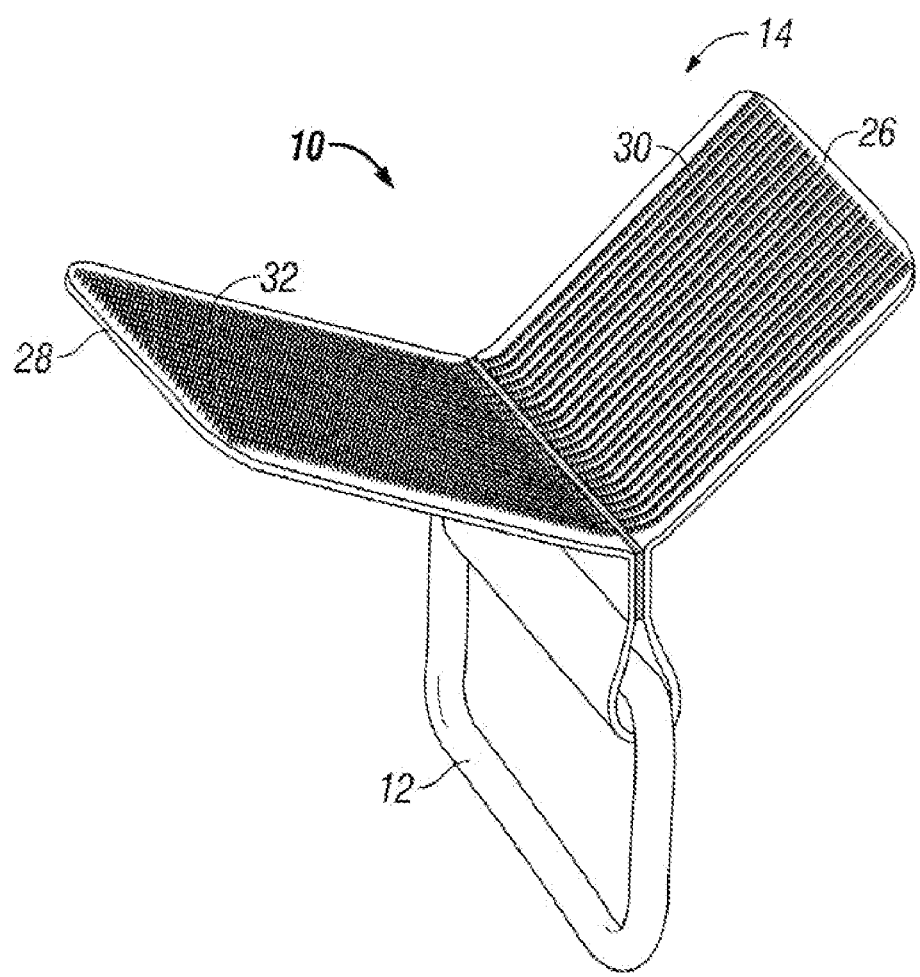
FIG. 3 is another side view of the buckle assembly of FIG. 1 in accordance with some embodiments.

FIG. 2A also illustrates the bonded section 24 of the attachment portion 14. As described above, the attachment portion material can be welded or bonded to itself in the bonded section 24. Accordingly, the bonded section 24 contains a bond 36. The bond 36 may be formed from welded j-hooks (e.g., j-hooks that have been ultrasonically melted together) or from any other suitable form of material joining. FIG. 3 illustrates another side view of the buckle assembly 10 of FIG. 1 in accordance with one embodiment. FIG. 3 more clearly shows the touch fastening elements on the arrays 30 and 32 of the first flap 26 and the second flap 28.

Figure 4:
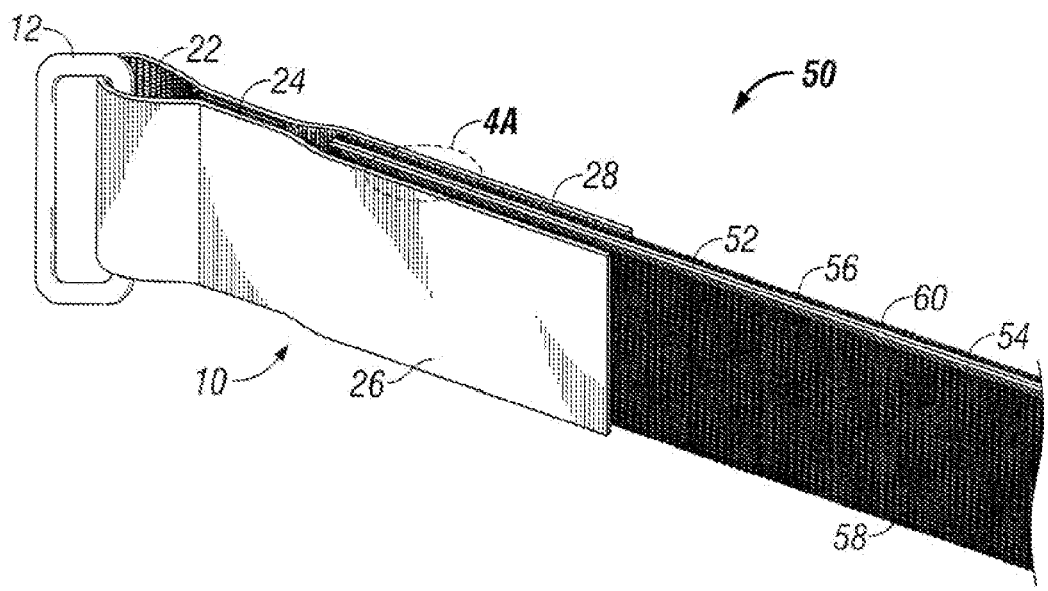
FIG. 4 is a side view of an exemplary strapping system in accordance with some embodiments.

FIG. 4 illustrates a side view of an exemplary strapping system 50 in accordance with some embodiments. The strapping system 50 includes the buckle assembly 10 and a strap 52. In various configurations, the strap 52 can be stretchy, flexible, or generally length-wise dimensionally stable (i.e., not stretchable without damage). The strap 52 has two faces 54 and 56 that each may have an array 58 and 60, respectively, of touch fastening elements. The touch fastening elements in the arrays 58 and 60 may include any of touch fastener types described above in regard to the arrays 30 and 32. In particular, the arrays 58 and 60 may have touch fastening elements that are complementary to touch fastening elements in the array 30, the array 32, or both. The touch fastening elements in the arrays 58 and 60 may be alike or different from each other. For example, the array 58 can have male touch fastening elements while the array 60 has female touch fastening elements or vice-versa. In one configuration, the array 58 or the array 60 is absent, and the strap 52 only has touch fastening elements on one of its faces.

The strap 52 may be created by joining two pieces of touch fastener material together such that the touch fastening elements on each piece of material face outward from the joining. For example, the two pieces of touch fastener material may be sewn, glued, laminated, or welded together. In other configurations, the strap 52 may be cast or formed with the arrays 58 and 60 integral to the strap 52 in the manner described in U.S. Pat. No. 4,872,243 to Fischer, for example. In one example, the strap 52 includes a piece of ULTRA-MATE® 805 double-sized loop material produced by and available from Velcro USA Incorporated of Manchester, N.H.

The touch fastening elements in the array 58, the array 60, or both are selected to be complementary to the touch fastening elements in the array 30, the array 32, or both. For example, if the array 30 is composed of male touch fastening elements (e.g., j-hooks, palm tree hooks, mushroom hooks, etc.), the array 58 will have female touch fastening elements (e.g., loops) or male touch fastening elements capable of joining to other male touch fastening elements (e.g., mushroom hooks). Further, if the array 30 is composed of a combination of male and female touch fastening elements (e.g., OMNI-TAPE®), the array 58 will have male touch fastener elements, female touch fastening elements, or both. Similarly, the arrays 32 and 60 (if present) may be capable of attaching to each other.

Figure 4A:
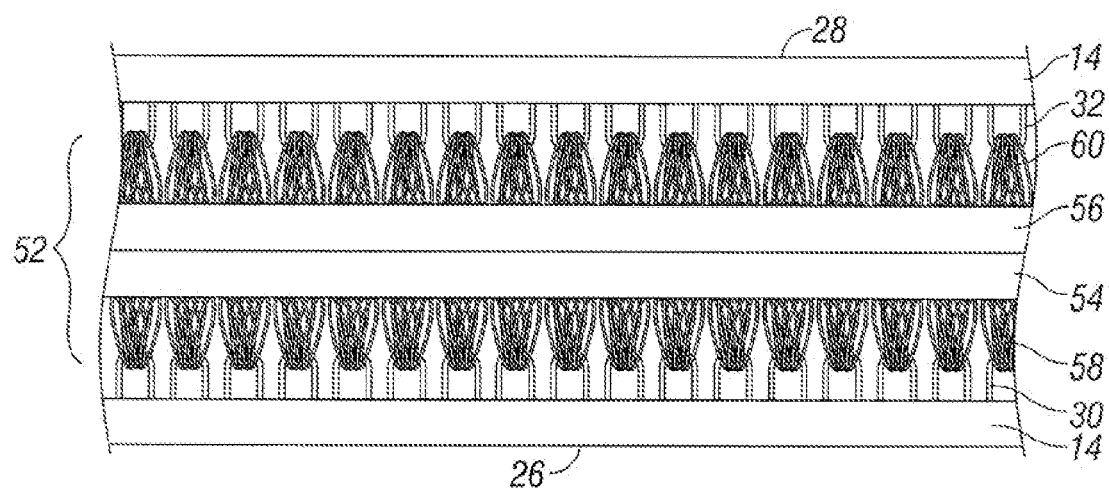
FIG. 4A is an enlarged cross-sectional view of the part of the strapping system of FIG. 4 in accordance with some embodiments.

FIG. 4A illustrates an enlarged cross-sectional view of the attachment portion 14 and the strap 28 of FIG. 4 in accordance with some embodiments. As shown, when the illustrated attachment portion 14 is attached to the strap 52, the arrays 30 and 32 on the flaps 26 and 28 are mated to complementary arrays 58 and 60 on the faces 54 and 56 of the strap 52. In this configuration, the mated arrays of touch fastening elements provide a closure between the buckle assembly 10 and the strap 52. This closure is relatively strong in shear to keep the buckle assembly 10 securely fastened to the strap 52 when the strapping system 50 is affixed or tightened around a bundle, for example, and yet relatively weak in peel allowing a person to toolessly remove the buckle assembly 10 from the strap 52 (if desired) by peeling one or both of the flaps 54 and 56. In this way, the buckle assembly 10 can be toolessly attached and detached from the strap 52.

FIG. 4A depicts a configuration of the strapping system 50 in which the "Y" shaped attachment portion 14 attaches to both of the faces 54 and 56 of the strap 52. This configuration, while not required, may increase the shear force resistance of the strapping system 50 by, amongst other reasons, providing touch fastening surfaces on both sides of the strap 52. In other words, the "Y" shape of the attachment portion 14 enables the buckle assembly to be simultaneously touch fastened to complementary touch fasteners on both of the faces 54 and 56, which provides resistance to shear forces and enables the strapping system 50 to be more aggressively tightened around a bundle. The simultaneous attachment may also providing a back-up in the case of an accidental peeling force on one of the flaps 26 and 28. The accidental peeling force on one of the flaps would create a shear force on the other flap. Because the touch fastening elements on the other flap have relative high resistance to this accidentally applied shearing force, accidental detachment of the buckle assembly may be discouraged.

Figure 5:
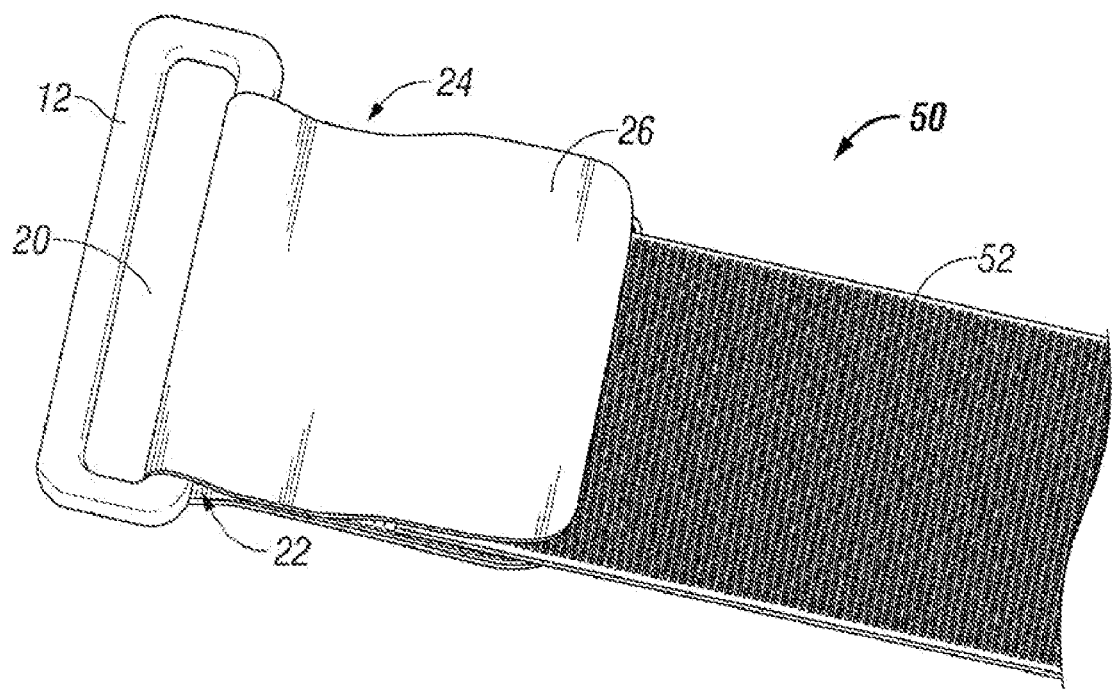
FIG. 5 is a top view of the strapping system of FIG. 4 in accordance with some embodiments.
Figure 9:
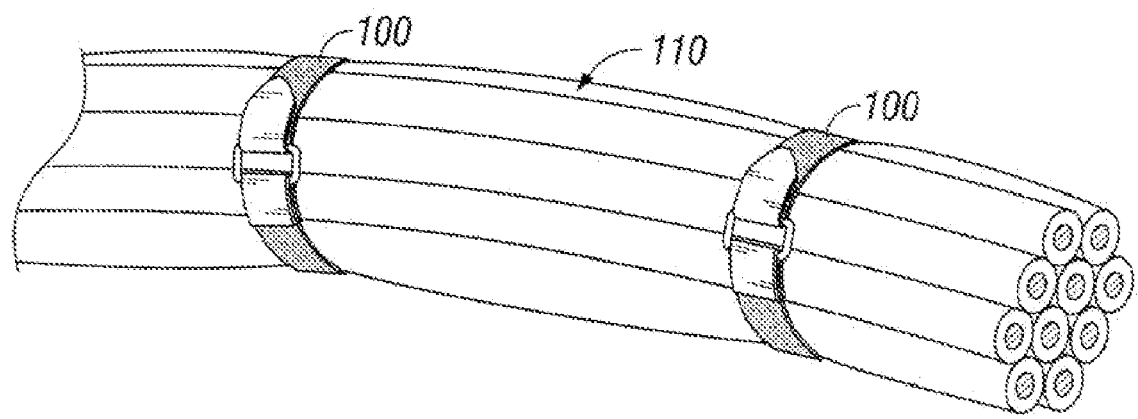
FIGS. 9 and 10 illustrate exemplary cables bundled together with the exemplary strapping systems in accordance with some embodiments.
Figure 10:
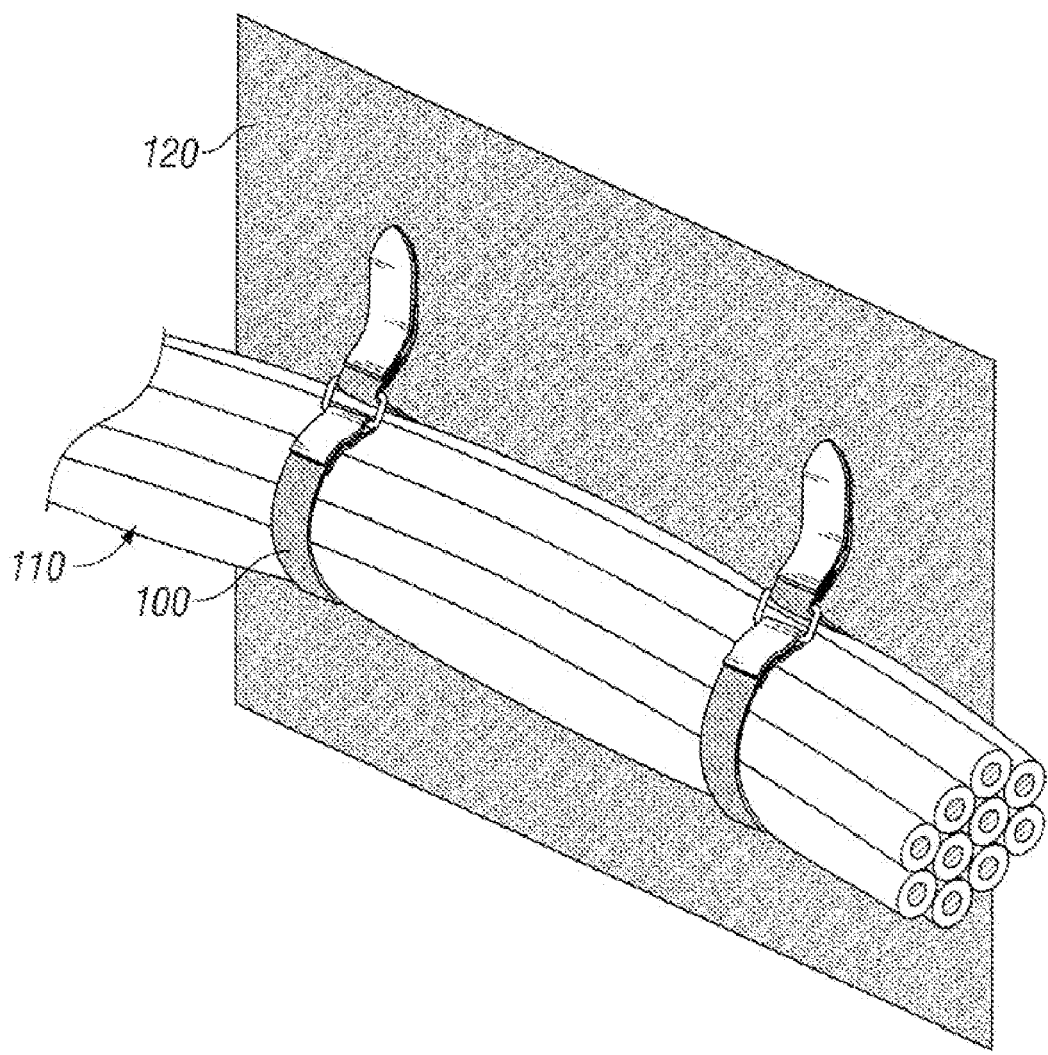

FIG. 5 illustrates a top view of the strapping system 50 in accordance with some embodiments. As shown, the opening 20 in the buckle 12 is sized to be able to receive the strap 52. FIGS. 9 and 10 below show the strap 52 disposed through the opening 20.

Figure 6:
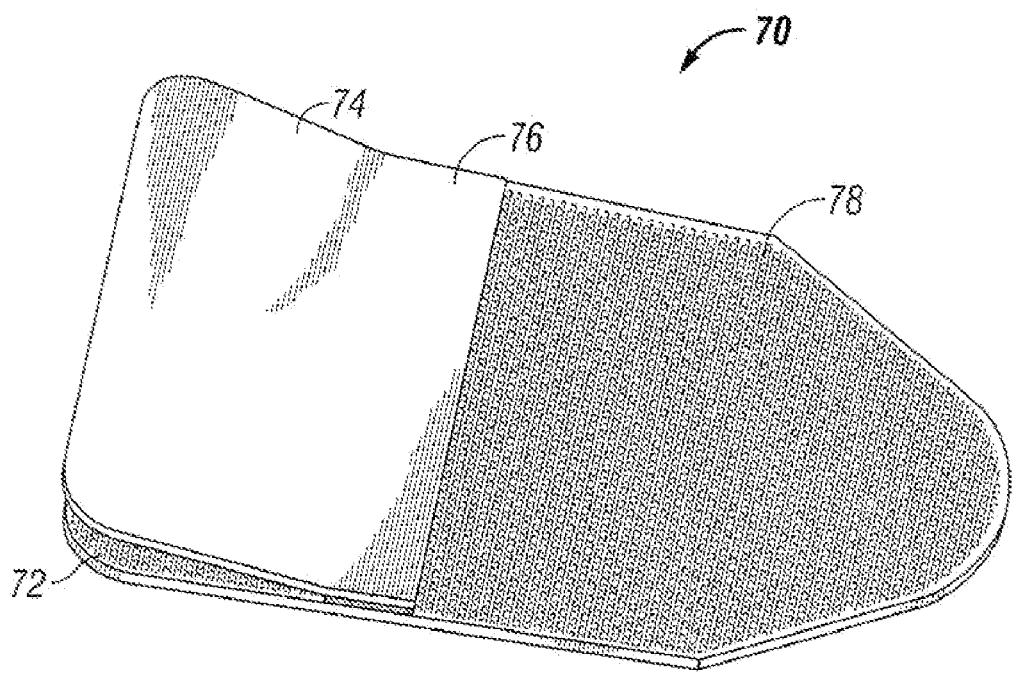
FIG. 6 is a top view of a tongue assembly in accordance with some embodiments.
Figure 7:
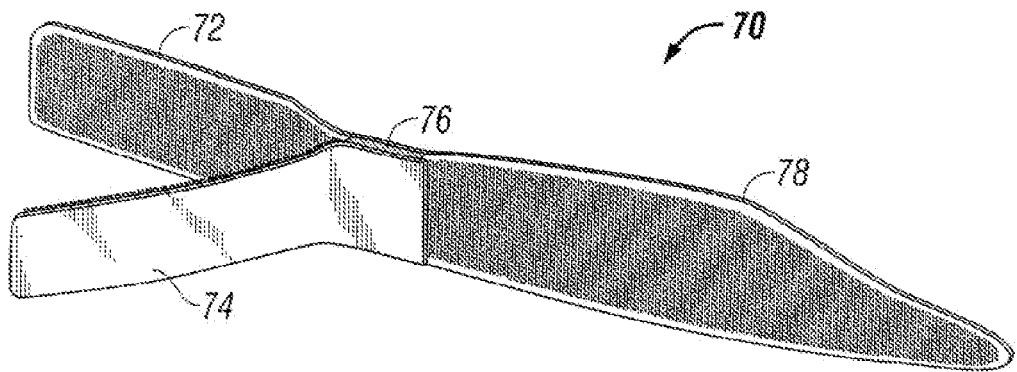
FIG. 7 is a side view of the tongue assembly of FIG. 6 in accordance with some embodiments.

In addition to the buckle assembly 10, a tongue assembly 70 may also be attached to the strap 52. FIGS. 6 and 7 illustrate top and side views, respectively, of the tongue assembly 70 in accordance with some embodiments. As shown, the tongue assembly 70 may include a first flap 72, a second flap 74, a bonded portion 76, and a tongue portion 78. As with the first flap 26 and the second flap 28 of the buckle assembly, the first and second flaps 72 and 74 may each include an array of touch fastening elements that complement the touch fastening elements in the array 58, the array 60, or both. In some configurations, the tongue assembly 70 may be constructed from the same touch fastener material as the attachment portion 14.

In the illustrated embodiment, the tongue assembly 76 is fashioned by bonding the second flap 74 to a piece of touch fastener material comprising both the first flap 72 and the tongue portion 78 such that the two pieces form a generally "Y" shape with touch fastening elements on the inner surface of either the first flap 72, the second flap 74, or both. The two piece of touch fastener material can be bonded (at the bonded portion 76) using any of the techniques described above for bonding the attachment portion 14 at the bonded section 24. The tongue portion 78 may include touch fastening elements or may be smooth. If the tongue portion 78 includes touch fastening elements, these touch fastening elements may be complementary to the touch fastening elements on the strap 52 to enable the tongue portion 78 to be touch fastened to the strap 52. The tongue portion 78 can be cut to have a distinctive shape (as illustrated) or may left uncut (i.e., typically rectangular). If the tongue portion 78 is cut, it can be cut either before or after the second flap 74 is joined.

Figure 8:
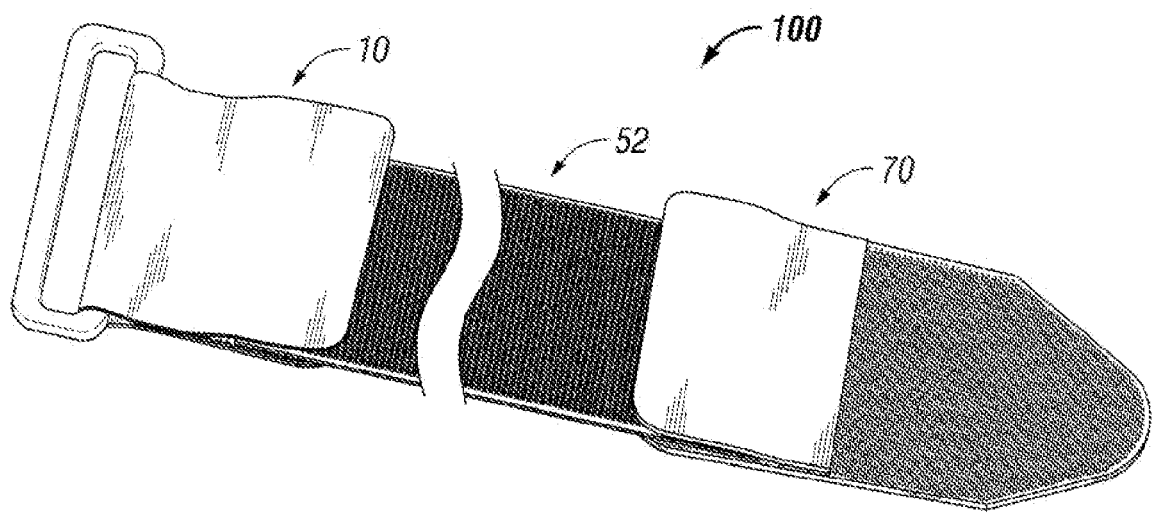
FIG. 8 is a top view of a strapping system in accordance with some embodiments.

The tongue assembly 76 can be attached to the strapping system 50 to form a strapping system 100 that has both a buckle and a tongue. One example configuration for the strapping system 100 including the tongue assembly 70 is shown in FIG. 8. As illustrated, the buckle assembly 12 and the tongue assembly 70 may be attached to opposite ends of the strap 52 to create the strapping system 100. The strapping system 100 can be used to bundle or strap together any one of number of items. For example, FIG. 9 illustrates exemplary cables 110 that are bundled together by two strapping systems 100. As shown, the tongue assemblies 70 of each of the strapping systems 100 are wrapped around the cables, passed through the opening 20 in the buckle 12, and then fastened to the strap 52 (as shown) to bundle the cables 110 together. Alternatively, the tongue assembly 70 may be touch fastened to another surface external to the strap 52 to enable the bundled cables or other items to be suspended by the strapping system 100. For example, FIG. 10 shows the cables 110 with a strapping system 100 wrapped around the cables 110 and the tongue portion 70 secured to a wall 120 having one or more touch fastening elements on it. In some configurations, the tongue assembly 70 is omitted and one of the arrays 58, 60 of touch fastening elements on the strap 52 is fastened to complementary touch fastening elements (e.g., J-hooks) on the wall 120.

Figure 11:
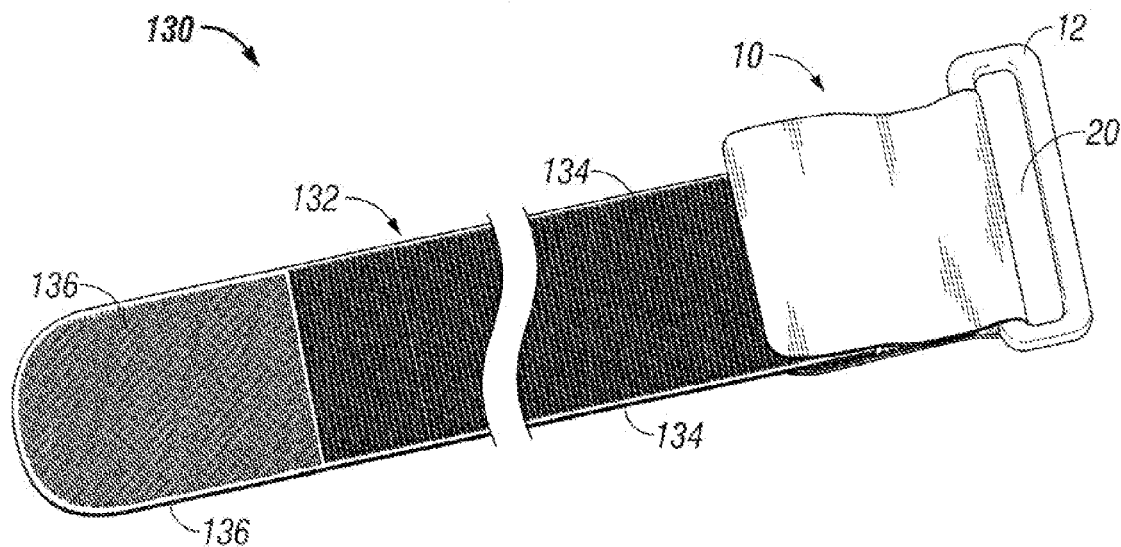
FIGS. 11 and 12 are perspective views of exemplary strapping systems in accordance with some embodiments.

In some embodiments, the tongue assembly 70 is omitted. For example, FIG. 11 illustrates an exemplary strapping system 130 including a strap 132 configured to touch fasten to itself. As shown, the strap 132 includes two arrays 134 and 136 of touch fastening elements that are complementary to each other. For example, if the array 134 includes male fastener elements, the array 136 includes female fastener elements or male fastener elements capable of mating with other male fastener elements (e.g., mushroom hooks). Because the strap 132 includes two arrays that can mate with each other, when the strapping system 130 is wrapped around a bundle, such as the cables in FIGS. 9 and 10, the strap 132 can be brought through the opening 20 and touch fastened to itself to secure the strap 132. Alternatively, the array 136 may also be touch fastened to another surface, such as the wall 120 of FIG. 10. In some configurations (not shown), the array 134 may be on one face of the strap 132 and the array 136 may be on another face of the strap 132. For example, the strap 132 may be a ONE-WRAP® self gripping strap produced by and available from Velcro USA Incorporated of Manchester, N.H.

Figure 12:
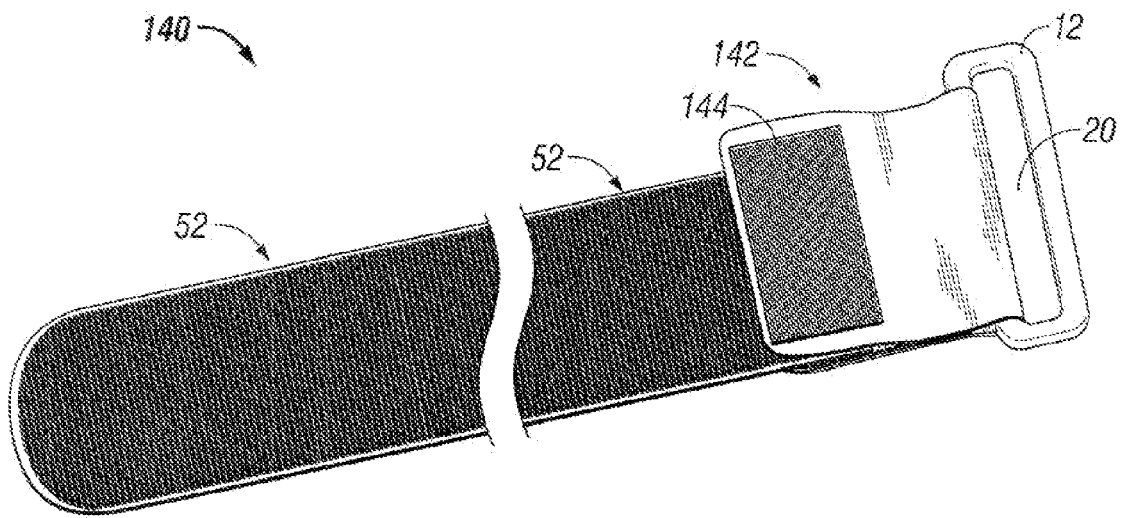
Figure 13:
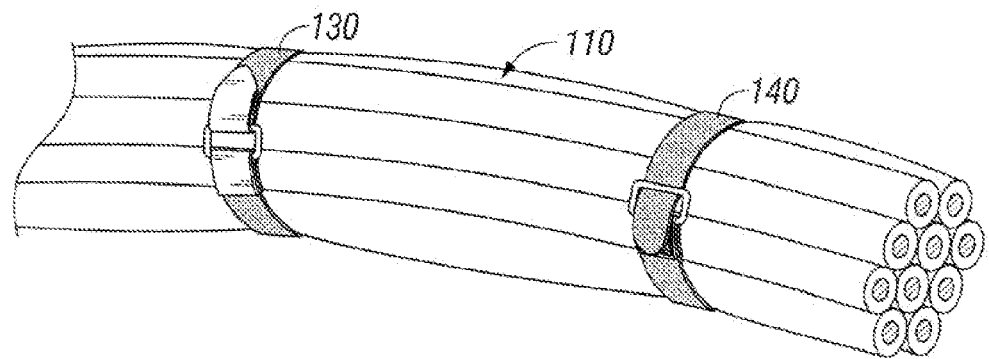
FIG. 13 illustrates exemplary cables bundled together with the exemplary strapping systems in accordance with some embodiments.

FIG. 12 illustrates an exemplary strapping system 140 in accordance with some embodiments. The strapping system 140 includes the strap 52, as described above with regard to FIG. 4. A buckle assembly 142 is attached to the strap 52. The buckle assembly 142 includes the buckle 12 with the opening 20 as described above. In addition, an outer surface of one or both sides of an attachment portion of the buckle assembly 142 includes an array of touch fastening elements that releasably engage touch fastening elements on the strap 52. In the way, amongst other uses, the strapping system 140 can be wrapped around a bundle and then touch fastened to itself (i.e., to the strap 52) to secure the strap 52. FIG. 13 illustrates the exemplary cables 110 bundled together by the strapping system 130 (FIG. 11) and the strapping system 140 (FIG. 14) in accordance with one embodiment.

Figure 14:
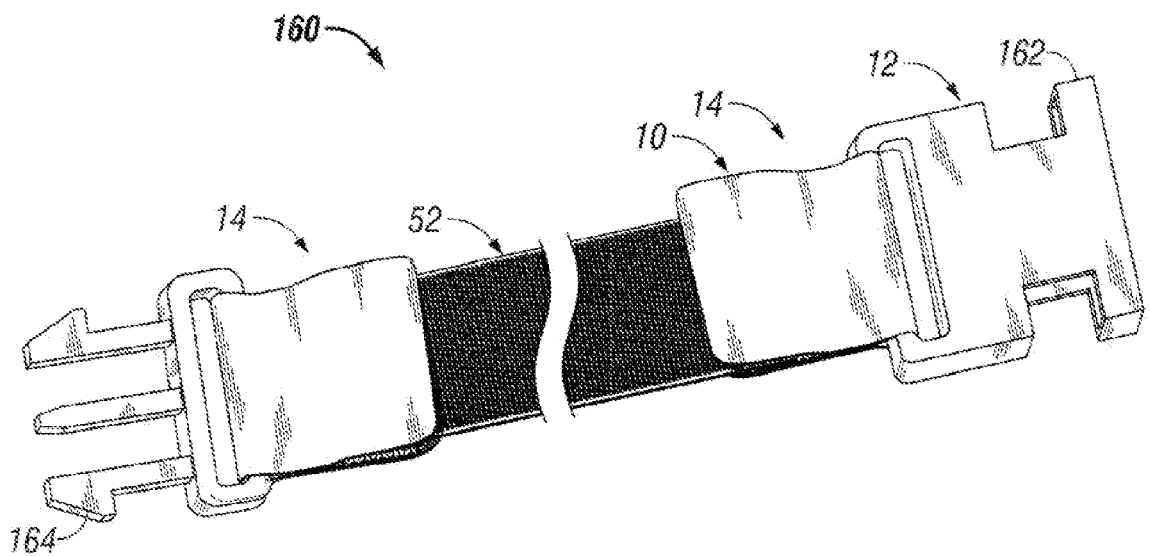
FIGS. 14, 15, and 16 are perspective views of exemplary strapping systems in accordance with some embodiments.
Figure 15:
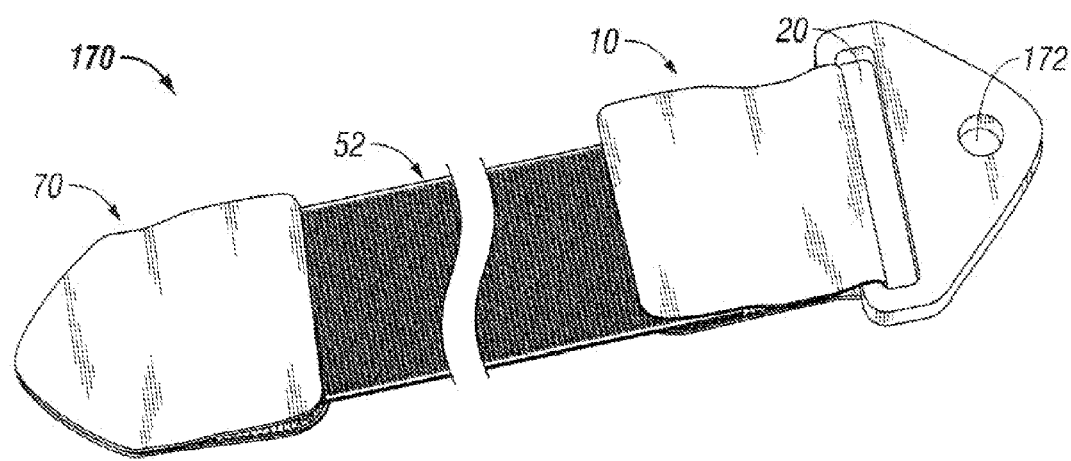

FIG. 14 illustrates an exemplary strapping system 160 in accordance with some configurations. The strapping system 160 includes the strap 52 and a buckle assembly 10, as described above with regard to FIG. 4. However, unlike the buckle assembly configuration illustrated in FIG. 1, in the buckle assembly configuration shown in FIG. 12, the buckle 12 has an interlocking portion 162 configured to mate with another buckle, namely buckle 154, on the other end of strap 52. Like the buckle 10, the buckle 164 is coupled to an attachment portion 14 that enables the buckle 14 to be attached to the strap 52. In FIG. 12, the buckle 164 is a male buckle and the buckle 12 is a female buckle. However, in alternate embodiment, the buckle may be reversed. Moreover, in other configurations, other any suitable interlocking buckle geometries may be employed.

FIG. 14 illustrates another exemplary strapping system 170 in accordance with some configurations. The strapping system 170 includes the buckle assembly 10, the strap 52, and the tongue 70. However, unlike the buckle assembly shown in FIG. 1, the buckle assembly of the strapping system 170 further includes an aperture 172 in addition to the opening 20. For example, the aperture 172 may be a circular aperture. Advantageously, aperture 172 can be employed to mount the strapping system 172 to another object using a fastener, such as a nail or a screw. For example, the strapping system could be nailed to a wall through aperture 172.

Figure 16:
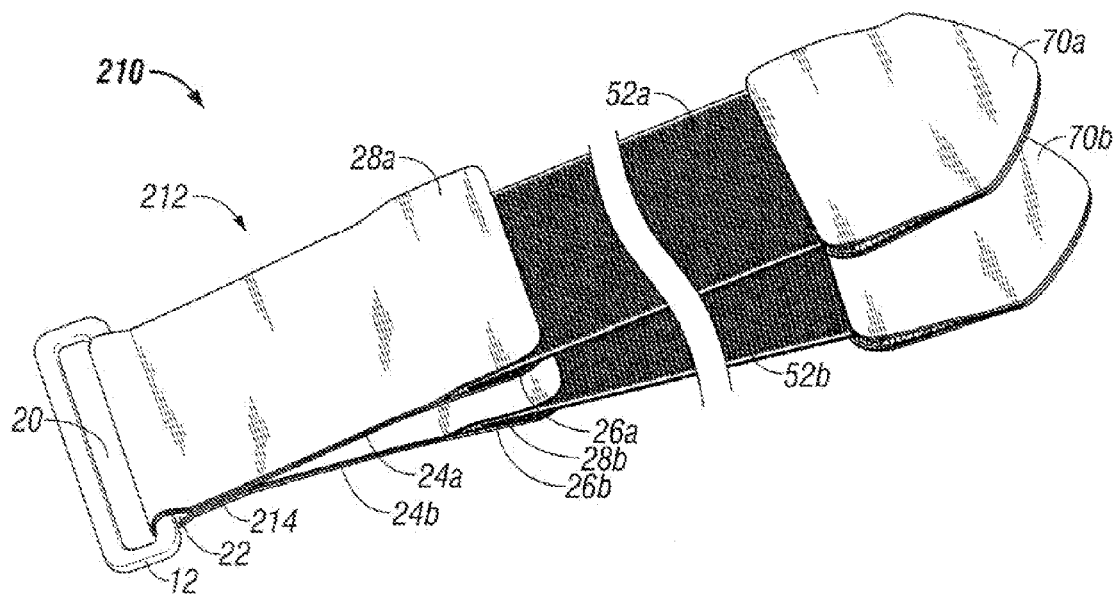

FIG. 16 illustrates yet another exemplary strapping system in accordance with some embodiments. As shown, the strapping system 210 has two straps 52a and 52 each of which is attached to tongues 70a and 70b, respectively. Each of the straps 52a and 52b is coupled to attachment portion 212. In particular, the straps 52a and 52b are attached to flaps 26a and 28a and flaps 26b and 28b, respectively. Flaps 26a and 28a are then bonded together at bonded section 24a using any of the bonding technique described above with regard to FIGS. 1-3.

Similar, flaps 26b and 28b are bonded together at bonded section 24b. The two bonded sections 24a and 24b are then bonded to each other at section 214. However, prior to bonding sections 24a and 24b together, one of the bonded sections 24a or 24b may be fed through the opening 20 of the buckle 12 such that when the bonded sections 24a and 24b are themselves bonded together, the wrapped around section 22 is formed around the buckle 12, as shown.

It will be seen by those skilled in the art that many embodiments taking a variety of specific forms and reflecting changes, substitutions, and alternations can be made without departing from the spirit and scope of the invention. Therefore, the described embodiments illustrate but do not restrict the scope of the claims.

What is claimed is:

1. A strapping system comprising:
a strap having first and second ends, and opposite first and second faces carrying first and second arrays of touch fastening elements, respectively; and
a buckle assembly releasably attached to the first end of the strap, the buckle assembly including:
a buckle defining an opening sized to receive the second end of the strap; and
an attachment portion coupled to the buckle, the attachment portion having opposing first and second surfaces that releasably engage the touch fastening elements on the first and second faces of the strap, respectively, to releasably secure the buckle to the strap with the first end of the strap positioned between the opposing first and second surfaces of the attachment portion and the second end of the strap spaced from the buckle assembly,
wherein the strap includes touch fastening elements engageable with other touch fastening elements of the strapping system such that, with the buckle assembly attached to the first end of the strap, the second end of the strap is configured to be wrapped about an object and inserted through the buckle opening, to secure the strapping system about the object.

2. The strapping system of claim 1, wherein the touch fastening elements that are engageable with other touch fastening elements of the strapping system when the buckle assembly is attached to the strap arc located on a distal end of the strap.

3. The strapping system of claim 1, wherein the touch fastening elements that are engageable with other touch fastening elements of the strapping system when the buckle assembly is attached to the strap are engageable with the first array of touch fastening elements.

4. The strapping system of claim 1, in which the strap comprises:
a strap body;
a tongue attached to the strap, the tongue assembly including:
a tongue portion; and
a second attachment portion coupled to the tongue portion, the second attachment portion having opposing surfaces that releasably engage the touch fastening elements on the first and second faces of the strap, respectively, to releasably secure the tongue portion to the strap.

5. The strapping system of claim 4, wherein the tongue portion includes an array of touch fastening elements configured to attach to the touch fastening elements on the first face.

6. The strapping system of claim 4, wherein the tongue assembly and the first surface of the second attachment portion comprise a single piece of material.

7. The strapping system of claim 1, wherein the array of touch fastening elements on the first face comprise female touch fastening elements and wherein the array of touch fastening elements on the first surface comprise male touch fastening elements.

8. The strapping system of claim 1, wherein the array of touch fastening elements on the first face comprise loop fasteners and wherein the array of touch fastening elements on the first surface comprise hook fasteners.

9. The strapping system of claim 8, wherein the array of touch fastening elements on the second surface also comprise hook fasteners.

10. The strapping system of claim 8, wherein the array of hook fasteners comprise j-hook hook fasteners.

11. The strapping system of claim 8, wherein the array of hook fasteners comprise molded hooks.

12. The strapping system of claim 8, wherein the array of loop fasteners comprise woven loop fasteners.

13. The strapping system of claim 1, wherein the strap is length-wise dimensionally stable.

14. The strapping system of claim 1, wherein the touch fastening elements carried on the first face of the strap are configured to releasably engage the touch fastening elements on the second face of the strap.

15. The strapping system of claim 1, wherein the buckle comprises a circular aperture.

* * * * *

UNITED STATES PATENT AND TRADEMARK OFFICE
CERTIFICATE OF CORRECTION

| | | |
|---|---|---|
| PATENT NO. | : 8,069,540 B2 | Page 1 of 1 |
| APPLICATION NO. | : 11/679110 | |
| DATED | : December 6, 2011 | |
| INVENTOR(S) | : Josep Cirera Obiols et al. | |

It is certified that error appears in the above-identified patent and that said Letters Patent is hereby corrected as shown below:

Col. 8, lines 42-43, Claim 2: after "system" delete "when the buckle assembly is attached to the strap arc" and insert -- are --;

Col. 8, lines 47-48, Claim 3: after "system" delete "when the buckle assembly is attached to the strap";

Col. 9, line 14, Claim 10: delete "j-hook hook" and insert -- j-hook --.

Signed and Sealed this
Nineteenth Day of February, 2013

Teresa Stanek Rea
*Acting Director of the United States Patent and Trademark Office*